Dec. 26, 1939.  J. P. McCARTHY  2,184,801
LIFT STRUCTURE
Filed July 3, 1939  2 Sheets-Sheet 2
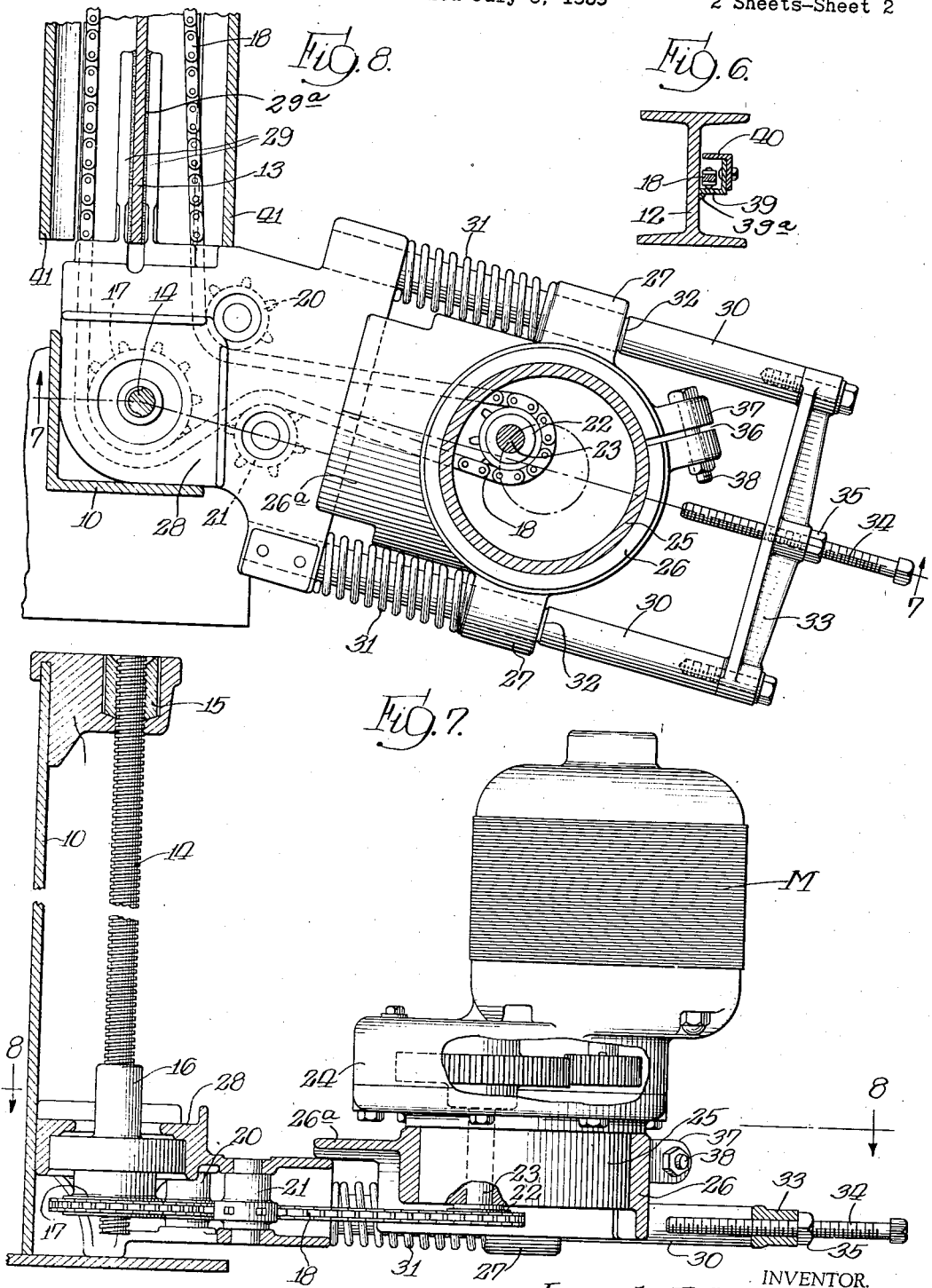
INVENTOR.
Joseph P. McCarthy,
BY Bair & Freeman
ATTORNEYS.

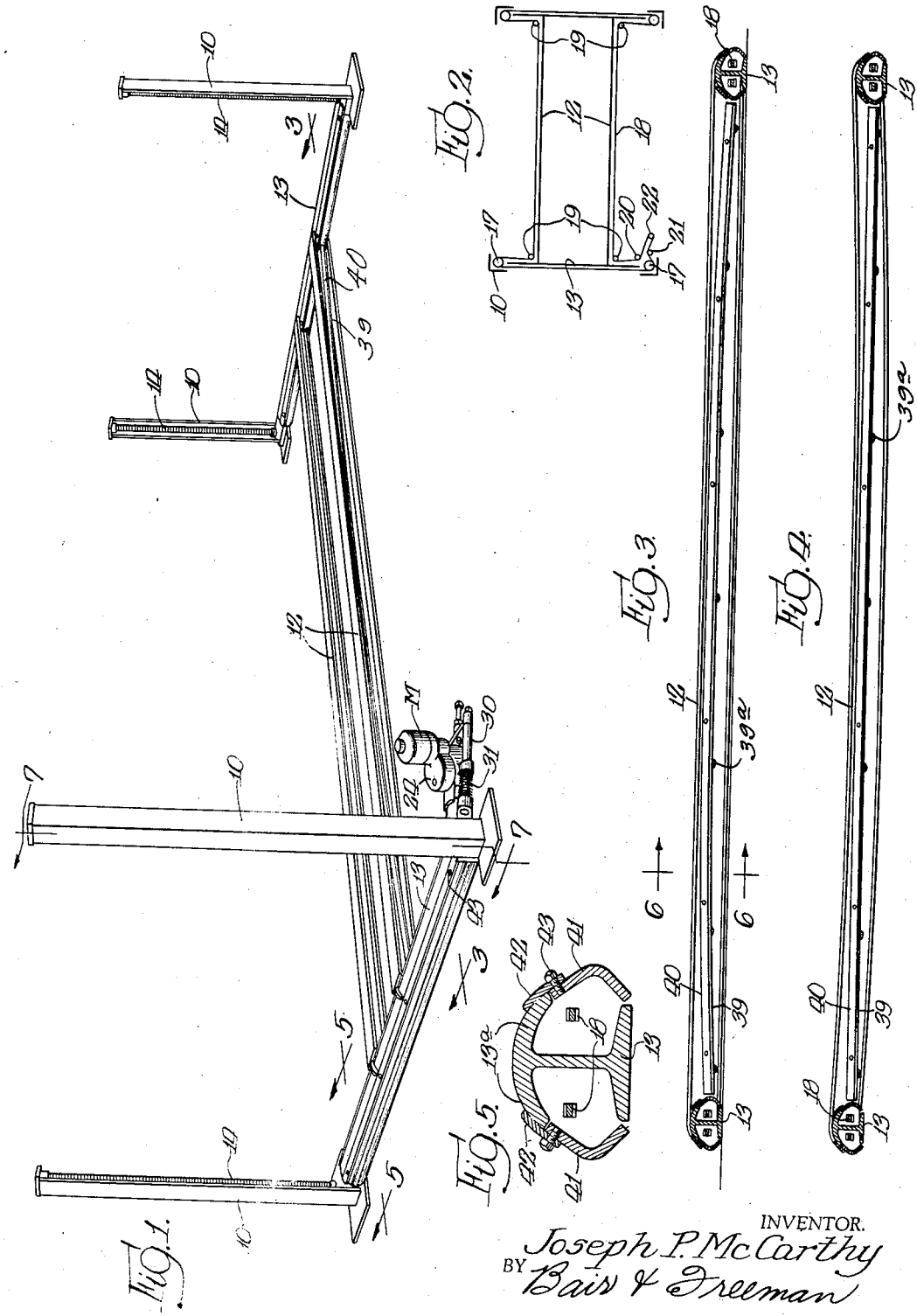

Patented Dec. 26, 1939

2,184,801

UNITED STATES PATENT OFFICE 2,184,801

LIFT STRUCTURE

Joseph P. McCarthy, Defiance, Ohio, assignor to Modern Equipment Corporation, Defiance, Ohio, a corporation of Ohio Application July 3, 1939, Serial No. 282,607

14 Claims. (Cl. 254—92)

An object of my invention is to provide a lift structure of the chain operated type having a simple and inexpensive means to retain the chain under substantially constant tension, take up wear in the links thereof and reduce breakage and wear particularly occasioned by excessive strains and tension imposed upon the chain when it commences to be propelled by the operating mechanism provided therefor.

Another object is to provide a floating mounting for a motor and drive sprocket of a lift wherein supporting means for the motor and drive sprocket is slidably mounted on a pair of rods and springs are provided on the rods to take up slack in the chain and keep it under a predetermined tension, regardless of operating conditions.

A further object is to provide a set screw cooperable with the supporting means so as to compress the springs during adjusting operation, the drive sprocket being eccentrically mounted in a rotatable sleeve carried by the supporting means so that the chain can be adjusted to compensate for wear and the supporting means retained in substantially the same position relative to the rods, whereby the springs mounted on the rods can be kept at a substantially constant tension.

Another object is to provide a lift structure including transverse supporting rails along which the operating chain traverses and detachable guards for the chain, which guards, however, do not interfere with the movement of a vehicle onto and off the lift.

Still a further object is to provide novel guides for the operating chain extending along the drive-on rails of a lift and having an inverse catenary curvature so that when the drive-on rails support a normal load the guides will assume a substantially level and straight position, thus eliminating undesirable curvature of the chain during operation under load.

In the accompanying drawings I have shown a preferred embodiment of my invention. These drawings are not intended to be exhaustive and are not to be taken as limiting of the invention, but on the contrary are chosen with a view to illustrating my invention so that others skilled in the art may apply it under varying conditions of practical use and may make such modifications and changes therein as such conditions may make desirable.

Figure 1 is a perspective view of a lift structure embodying my invention;

Figure 2 is a diagrammatic plan view of the operating mechanism thereof;

Figure 3 is an enlarged sectional view on the line 3—3 of Figure 1 showing the longitudinal drive-on rail of the lift in its normal position when resting on a floor surface;

Figure 4 is a similar view showing the position the parts assume when under load;

Figure 5 is an enlarged sectional view on the line 5—5 of Figure 1 showing chain guards for the transverse supporting rails of the frame of my lift structure;

Figure 6 is an enlarged sectional view on the line 6—6 of Figure 3 showing a chain guide;

Figure 7 is an enlarged sectional view on the line 7—7 of Figure 1, and

Figure 8 is a sectional view on the line 8—8 of Figure 7.

On the accompanying drawings, I have used the reference numeral 10 to indicate corner posts for supporting a lift frame. The lift frame consists of longitudinal drive-on rails 12 and transverse supporting rails 13. Each post 10 carries a stationary threaded rod 14 having its upper end welded in a nut 15, as shown in Figure 7. The post 10 has a cap member 12 in which the nut 15 is engaged to suspend the threaded rod 14.

Rotatable on each threaded rod 14 is a nut 16 including a sprocket 17. The sprockets 17, as shown diagrammatically in Figure 2, are driven by a continuous chain 18 passing over suitable idlers 19, 20 and 21. The chain 18 also passes over a drive sprocket 22.

The drive sprocket 22 is mounted on a shaft 23 which is suitably journaled in a gear casing 24. The gear casing 24 has a sleeve 25 rotatable in a supporting member 26. A guard flange 26a extends from the support 26 to cover the operating chain 18 and thus prevent the possibility of anyone getting his fingers caught therein. The supporting member 26 is provided with a pair of perforated ears 27.

Referring to Figure 8, a casting 28 is shown having a pair of flanges 29 welded as at 29a to one end of one of the transverse supporting rails 13. A pair of rods 30 are supported by the casting 28 and slidably receive the ears 27 of the supporting member 26. Springs 31 are mounted on the rods 30 and interposed between the ears 27 and the casting 28. Indicating marks such as grooves 32 are provided on the rods 30 to indicate when the springs 31 are contracted to their desired predetermined tension.

A cross bar 33 is carried by the rods 30 and in turn supports a set screw 34. The set screw 34 is normally in the position shown in Figure 8, and may be retained in such position by a lock nut 35.

The shaft 23, it will be noted by referring to Figure 8, is eccentrically mounted relative to the sleeve 25 so that when the sleeve is rotated in the supporting member 26, the operating chain 18 may be tightened or loosened as desired. To retain it in any adjusted position, the member 26 is split, as indicated at 36, between a pair of ears 37. A clamp bolt 38 is provided for the ears 37.

Where the operating chain 18 extends along the drive-on rails 12, guides 39 in the form of angle bars (see Figure 6) are provided therefor. Other angle bars 40 are detachably secured to angle 39 to enclose the chain 18. Guides 39 (it will be noted by referring to Figure 3) are curved upwardly at their longitudinal centers, the curvature being preferably an inverse catenary curve. The degree of curvature is predetermined by the degree of catenary curvature that will ocur in the drive-on rails 12 when a normal load is imposed thereon, as shown in Figure 4. When such load is imposed on the rails 12, it is then desirable that the guides 39 assume a substantially straight level position and this result of course can be obtained by having the inverse catenary curve of the guide of the proper degree when there is no load on the rail 12. The guides 39 are welded in position as at 39a.

In connection with the transverse supporting rails 13, I provide guards 41 for the chain 18 where the chain extends along these rails below down-curved upper flanges 13a thereof. At spaced points, lugs 42 are welded to the flanges 13a and cap screws 43 extend through the lugs and are threaded in the guards 41. With this arrangement the guards 41 are readily removable whenever it is desirable to gain access to the chain for repair or renewal. The guards 41, however, do not interfere with the passage of a vehicle over the flanges 13a, which are down-turned to facilitate such passage.

*Practical operation*

In the operation of my structure after the chain 18 has been threaded in position, the set screw 34 is engaged with the supporting member 26 and adjusted to a point where the springs 31 are compressed enough for the grooves 42 to show behind the ears 27. The operator then knows that the springs 31 are under the desired tension, inasmuch as the tension of the spring compressed to this point is predetermined at the factory and the groove located accordingly. With the clamp bolt 38 loosened, the sleeve 25 may now be rotated to take up the slack in the chain 18, whereupon the bolt 28 may be tightened and the set screw 34 backed off and locked in position with the nut 35.

The supporting member 26 is now freely floating on the rods 30 under the desired tension of the springs 31. When the motor M that drives the shaft 23 and the sprocket 22 is energized, I have found that there is always an excessive strain on the chain at this time, whereas with my floating mounting the springs 31 will be slightly compressed for a moment, thus keeping the tension of the chain substantially constant instead of permitting these largely increased stresses, which result in undue wear and breakage. By actual test, I have found that breakage and wear have been reduced to less than fifty per cent, and the expense of maintaining the chain in connection with a lift of the type described is therefore much less than when a floating mounting is not provided.

As the links and pins of the chain wear and the chain becomes loose, the springs 31 will expand, thus decreasing the tension slightly but nevertheless maintaining it substantially constant. After some wear, then the set screw 34 can be again used to compress the springs 31 and the eccentric sleeve 25 adjusted for taking up the slack of the chain.

Another feature of my invention which substantially reduces chain breakage consists of the chain guide 39 arranged on an inverse catenary curve. A chain when operating on edge and with a sag between spaced points thereof effects imposition of strains on the pins and links thereof which tend to wear the chain quickly and, under heavy load conditions when the chain is taut, there is considerable leverage on each link and pin due to the weight of the chain in a sagging position. By arranging the guide, however, so that when the load is imposed on the lift the guide will assume a substantially straight position, as shown in Figure 4, it is possible to minimize the strain on the chain and thus greatly reduce the chances of breakage.

The operating chain 18 is somewhat protected by the downcurved flanges 13a whereas the guards 41 serve as further protection and are arranged so that they may be readily removed. This is effected by the welding of the lugs 42 in position with the cap screws 43 readily removable, whereupon the guards 41 may be detached. With the guards 41 removed and also the angle bar covers 40 removed from the guides 39, it is a comparatively simple matter to string a new chain in position or examine any part of the chain and effect repairs thereon when desired.

Taken collectively, these features of construction of my invention make for a more efficient and foolproof lift and also one which gives many more years of service without chain replacement than has heretofore been possible.

In accordance with the provisions of the patent statutes, I have described the principle of operation of my invention together with an illustration of a lift structure which I consider to represent the best embodiment thereof, but I desire to have it understood that the structure disclosed is only illustrative and that the invention may be carried out by other means within the scope of the appended claims.

What I claim as new and desire to secure by Letters Patent of the United States is:

1. In a lift structure, a lift frame, nut and screw means at each corner thereof for elevating said lift frame upon relative rotation of said nut and screw means, a drive sprocket, supporting means on said lift frame for said drive sprocket, a continuous chain extending around each nut and screw means and around said drive sprocket, said supporting means being movably mounted relative to said lift frame for varying the tension of said chain, and spring means cooperating with said supporting means and tending to move it in a direction to increase the tension of said chain, said spring means being under a predetermined tension to retain the tension of said chain substantially constant.

2. In a lift structure, a lift frame, a stationary supporting screw at each corner thereof, a rotatable nut on each screw for elevating said lift frame upon rotation of said nut, a drive sprocket, supporting means therefor carried by said lift frame, a continuous chain extending around each nut and around said drive sprocket, and means cooperating with said supporting means and tending to move it in a direction to increase the tension of said chain.

3. In a lift structure, a lift frame, a stationary supporting screw at each corner thereof, a rotatable nut on each screw for elevated said lift frame upon rotation of said nut, a drive sprocket, supporting means therefor carried by said lift frame, a continuous chain extending around each nut and around said drive sprocket and spring means under predetermined tension and engaging said supporting means to move it in a direction to increase the tension of said chain.

4. In a lift structure, a lift frame, nut and screw means at each corner thereof for elevating said lift frame upon relative rotation of said nut and screw means, a drive sprocket supported on said lift frame, a continuous chain extending around each nut and screw means and around said drive sprocket, spring means cooperating with said drive sprocket and tending to move it in a direction relative to said lift frame so as to increase the tension of said chain, said spring means being under a predetermined tension to retain the tension of said chain substantially constant, means to move said drive sprocket against the bias of said spring means to relieve the tension of said chain, said drive sprocket being adjustable relative to said supporting means to secure the desired predetermined tension on said chain when said supporting means is in a predetermined position of movement relative to said lift and said spring means is thereby under its predetermined tension, said means to move said drive sprocket being thereupon movable to a position permitting the drive sprocket to float on said spring means during subsequent operation of the drive sprocket and chain.

5. In a lift structure, a lift frame, nut and screw means at each corner thereof for elevating said lift frame upon relative rotation of said nut and screw means, a drive sprocket mounted on said lift frame, a continuous chain extending around each nut and screw means and around said drive sprocket, spring means cooperating with said drive sprocket and tending to move it relative to said lift frame in a direction to increase the tension of said chain, said spring means being under a predetermined tension to retain the tension of said chain substantially constant, means to move said drive sprocket against the bias of said spring means to relieve the tension on said chain, said means to move said drive sprocket being thereupon movable to a position permitting the drive sprocket to float on said spring means during subsequent operation of the drive sprocket and chain.

6. In a lift structure, a lift frame, nut and screw means at each corner thereof for elevating said lift frame upon relative rotation of said nut and screw means, a drive sprocket, a continuous chain extending around each nut and screw means and around said drive sprocket, supporting means for said drive sprocket mounted on said lift frame and movably mounted relative thereto for varying the tension of said chain, spring means cooperating with said supporting means and tending to move it in a direction to increase the tension of said chain, means to move said supporting means against the bias of said spring means to relieve the tension on said chain, said drive sprocket being adjustable relative to said supporting means to secure the desired predetermined tension on said chain when said supporting means is in a predetermined position of movement relative to said lift and said spring means is thereby under its predetermined tension, said means to move said supporting means being thereafter movable to a position permitting the supporting means to float on said spring means during subsequent operation of the drive sprocket and chain.

7. In a lift structure, a lift frame, a threaded rod at each corner thereof, a nut on each rod for elevating said lift frame upon rotation of said nut, a drive sprocket, a continuous chain extending therearound and around said nuts to impart rotation to them upon rotation of the drive sprocket, supporting means for said drive sprocket, a pair of rods extending from said lift frame, said supporting means being slidable thereon, an annular member for mounting said drive sprocket, said annular member being rotatable adjustable relative to said supporting means and said drive sprocket being eccentrically located relative to the axis of rotation thereof, springs on said rods tending to move said supporting means in a direction for tightening the tension of said chain and a set screw carried by said rods and engageable with said supporting means to compress said springs during adjusting operations, said rods being provided with means to indicate the length and thereby the tension of said springs.

8. In a lift structure, a lift frame, a threaded rod at each corner thereof, a nut on each rod for elevating said lift frame upon rotation of said nuts, a drive sprocket, a continuous chain extending therearound and around said nuts to impart rotation to them upon rotation of the drive sprocket, supporting means for said drive sprocket, a pair of rods extending from said lift frame, said supporting means being slidable thereon, an annular member for mounting said drive sprocket, said annular member being rotatably adjustable relative to said supporting means and said drive sprocket being eccentrically located relative to the axis of rotation thereof, springs on said rods tending to move said supporting means in a direction for tightening the tension of said chain.

9. In a lift structure, a lift frame, a threaded rod at each corner thereof, a nut rotatable on each rod for elevating said lift frame upon rotation of said nuts, a drive sprocket, a continuous chain extending therearound and around said nuts to impart rotation to them upon rotation of the drive sprocket, supporting means for said drive sprocket, rods extending from said lift frame, said supporting means being slidable thereon, a bearing for said drive sprocket, said bearing being rotatably adjustable relative to said supporting means and being eccentrically located relative to the axis of rotation of the supporting means, springs on said rods tending to move said supporting means in a direction for tightening the tension of said springs, said rods being provided with means to indicate the length and thereby the tension of said springs.

10. In a lift structure, a frame including longitudinal drive-on rails and transverse supporting rails, said supporting rails being in the form of I beams having down curved upper flanges, spaced lugs extending from the terminal edges of said flanges, an operating chain extending along said supporting rails below said down curved upper flanges thereof, guards for said operating chain extending from a position against said lugs to a position adjacent the terminal edges of the lower flanges of said supporting rails and means for detachably securing said guards to said lugs.

11. In a lift structure, a frame including longitudinal drive-on rails and transverse supporting rails, said supporting rails being in the form of I beams, spaced lugs extending from the terminal edges of the upper flanges thereof, an operating chain extending along said supporting rails below said upper flanges, angle shaped guards for said operating chain extending from a position against said lugs, outwardly and then inwardly to a position adjacent the terminal edges of the lower flanges of said supporting rails and means for detachably securing said guards to said lugs.

12. In a lift structure, a frame including longitudinal drive-on rails and transverse supporting rails, an operating chain extending along said drive-on rails, guides for said chain, said guides extending longitudinally of said drive-on rails and being curved upwardly at their centers with an inverse catenary curve, whereby upon a normal load being supported by said drive-on rails the downward bowing thereof will result in said chain guides assuming a substantially straight level position.

13. In a lift structure, a frame including longitudinal drive-on rails and transverse supporting rails, an operating chain extending along said drive-on rails, guides for said chain, said guides extending longitudinally of said drive-on rails and being curved upwardly at their centers whereby upon a load being supported by said drive-on rails the downward bowing thereof will result in said chain guides assuming a substantially straight position.

14. In a lift structure, a frame including longitudinal drive-on rails and transverse supporting rails, an operating chain extending along said drive-on rails, guides for said chain, said guides extending longitudinally of said drive-on rails and being curved upwardly at their centers with an inverse catenary curve and cover guards detachably secured to said guides.

JOSEPH P. McCARTHY.